United States Patent
Amacker et al.

(10) Patent No.: US 9,588,632 B1
(45) Date of Patent: Mar. 7, 2017

(54) TECHNIQUES FOR PROVIDING PERSONALIZED BEHAVIOR-BASED CONTENT

(75) Inventors: Matthew W. Amacker, Santa Clara, CA (US); Yusuf Moosbhoy Mohsinally, Santa Clara, CA (US)

(73) Assignee: A9.com, Inc., Palo Alto ( * ) Notice: Subject to any disclaimer, the term of this patent is extended or adjusted under 35 U.S.C. 154(b) by 1011 days.

(21) Appl. No.: 13/114,734

(22) Filed: May 24, 2011

(51) Int. Cl.
    *G06F 3/048* (2013.01)
    *G06F 17/00* (2006.01)
    *G06Q 30/00* (2012.01)
    *G06F 17/30* (2006.01)

(52) U.S. Cl.
    CPC .............. *G06F 3/048* (2013.01); *G06F 17/30* (2013.01); *G06Q 30/00* (2013.01)

(58) Field of Classification Search
    CPC .......... G06F 3/048; G06F 17/00; G06Q 30/00
    USPC ........................................................ 715/845
    See application file for complete search history.

(56) References Cited

U.S. PATENT DOCUMENTS

| | | | |
|---|---|---|---|
| 6,466,918 B1 * | 10/2002 | Spiegel et al. | 705/7.29 |
| 7,295,995 B1 * | 11/2007 | York et al. | 705/26.8 |
| 7,594,189 B1 * | 9/2009 | Walker et al. | 715/811 |
| 7,676,400 B1 * | 3/2010 | Dillon | 705/26.7 |
| 7,897,426 B2 * | 3/2011 | Maehara | 438/70 |
| 2002/0138331 A1 * | 9/2002 | Hosea et al. | 705/10 |
| 2002/0174230 A1 * | 11/2002 | Gudorf et al. | 709/227 |
| 2002/0198882 A1 * | 12/2002 | Linden | G06F 17/30867 |
| 2003/0028871 A1 * | 2/2003 | Wang et al. | 725/9 |
| 2003/0105682 A1 * | 6/2003 | Dicker et al. | 705/27 |
| 2010/0122178 A1 * | 5/2010 | Konig et al. | 715/738 |
| 2012/0192082 A1 * | 7/2012 | Bakalov et al. | 715/747 |

* cited by examiner

*Primary Examiner* — Jennifer To
*Assistant Examiner* — Hugo Molina
(74) *Attorney, Agent, or Firm* — Hogan Lovells US LLP

(57) ABSTRACT

Systems and methods for providing personalized content in substantially real time are presented. In one embodiment, a method for providing personalized content in substantially real time includes providing first content including a plurality of user-selectable content elements, detecting an interaction of a user with respect to the provided content including a selection by the user of one of the plurality of the user-selectable content elements displayed on a page of the first content, and providing second content in response to a request. The second content includes at least a portion of the first content modified according to the detected interaction by moving the user-selectable content element up on a page of the second content relative to a position of the content element on the page of the first content.

25 Claims, 14 Drawing Sheets

TECHNIQUES FOR PROVIDING PERSONALIZED BEHAVIOR-BASED CONTENT

BACKGROUND

Entities having a presence in an electronic environment, such as may be provided via a Web site or other such source of content, often take advantage of the full capabilities of modern Web-based services to deliver a compelling user experience. For example, an Internet user may access network resources such as Web sites offering items, products, or services for sale. Usually, these Web sites contain many different types of content, often on the same page and in near proximity to each other. The content presented by such a Web site may include information about each item, such as price, description, images, availability and other types of data associated with the item. The Web site may further contain a significant amount of additional information, such as may include customer reviews associated with each item, advertisements, related products, hyperlinks to related network resources, and the like. The large amount of content provided can make a page or site look "busy" and difficult to navigate, and ultimately may overwhelm a user, which could divert the user from using the site.

Furthermore, a user of such a Web site may wish to repeatedly conduct one or more particular types of operation; for example, a user may search for item(s) of interest using a search service associated with the Web site. However, in order to initiate a search, a user may have to navigate through many different types or displays of content as described above that clutter the page or site, and thus distract the user from his or her task. As a result, a user may be frustrated or at best dissatisfied with his or her experience with the Web site.

DETAILED DESCRIPTION

Figure 1:
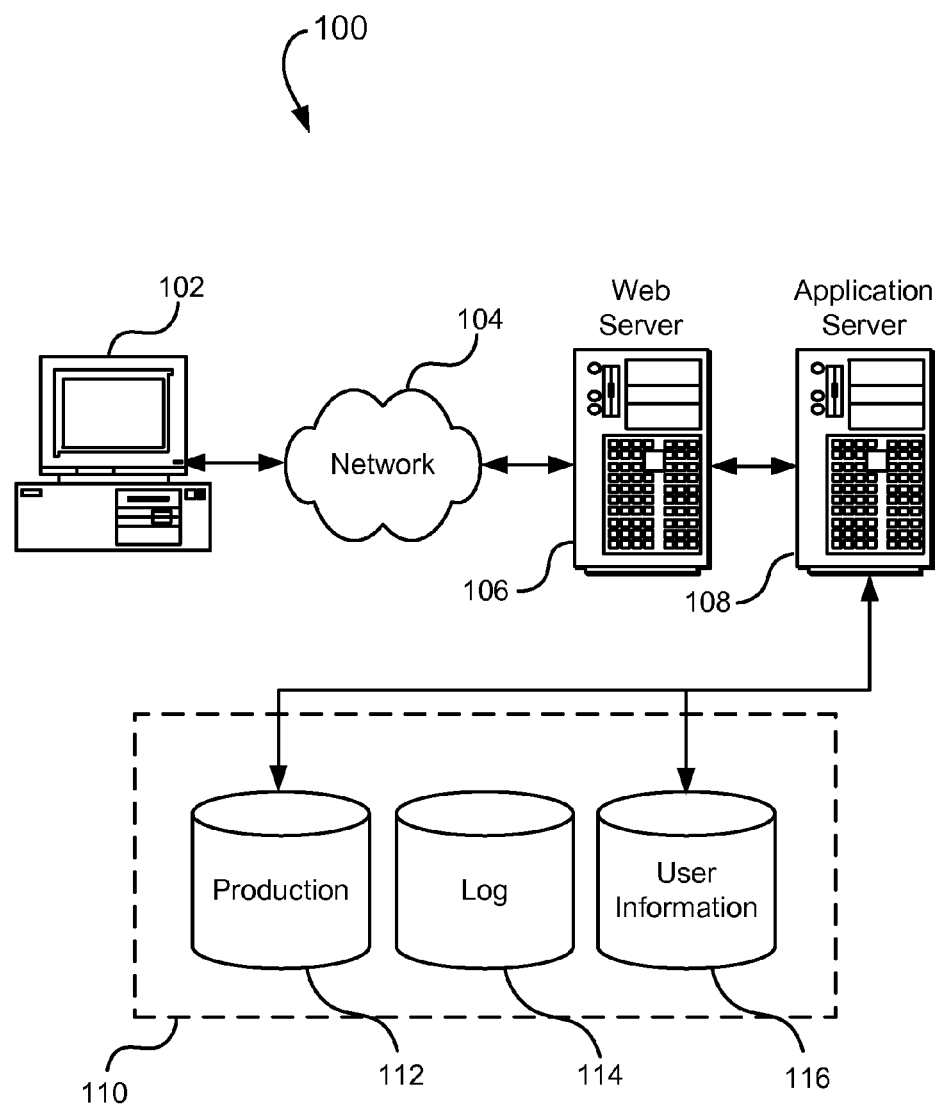
FIG. 1 illustrates an environment in which various embodiments can be implemented.

Techniques are presented for providing personalized content, as may be created for a user in real time based on the user's activity with respect to certain content. In a network-based environment (e.g., based upon the Internet), a user may conduct various types of activities, for example, view products offered for sale or search for any item of interest (e.g., a product, video or audio content, an image, and the like) on a network resource using one or more search services, such as at least one network search engine. A network resource may include a collection of content such as a Web site or electronic marketplace that can be accessed through a client browser or other such interface and displayed on a display element of a computing device. A network resource visited by a user may contain information for one or more items (e.g., products or services) that the user has located, such as through browsing or search. Based on the user's activities with respect to the network and/or network resource, the network resource may be modified in substantially real time with personalized content in order to "tailor" the content to user's current interests and make user experience with the network resource more personal, efficient, and compelling.

In accordance with an embodiment, a user, while interacting with rendered content, may access (e.g., select) selectable content elements provided with the content. A selectable content element can include any graphical, virtual, or physical element that can be selected, entered, activated, or otherwise indicated by a user through a device. For example, a user may select a "search" button, an item category (e.g., Electronics), a price range for a particular type of product (e.g., a user may request to view men's watches in the range from $500 to $1,000), and the like on an electronic marketplace such as a Web site. A trusted script loaded on a user's browser may detect user activities on the Web site and record them in a local (e.g., browser-associated) or remote data repository. The recorded user activity may be analyzed and optimal, personalized configuration of the content elements and their placement may be determined, for example, during a user session.

When a user requests an updated content by, for example, refreshing a Web page, the Web page may be modified according to the user preferences derived from the analysis of the user activity. For example, the most often selected content elements may be placed prominently relative to the content elements that were not selected by the user or relative to those elements selected by the user a number of times that is below a predetermined threshold. Displaying selected content elements (e.g., item category, a "search" button, or price range) prominently may be accomplished by placing these content elements above other content elements on the page, for example, by moving these elements to the top of the page and/or changing color (e.g., color intensity), size, shape, or other display properties of the content elements. In an embodiment, each selected content element may be assigned a weight value reflecting the amount of user activity associated with this element. This weight value may be used to determine a degree of prominence of the content element, for example, how far up to the top of the page the content element should be moved. In an embodiment, a weight value assigned to a selected content element may be given a special "boost" in order to make the content element more prominent on a modified page when the content element is associated, for example, with a product popular with other users.

In an embodiment, a user profile (e.g., "price comparison person" or "customer review reader") may be determined based on the analysis of the user activity. Accordingly, a selectable content element or a cluster of selectable content elements corresponding to the determined user profile may be identified and rendered to the user during a user session or in subsequent sessions.

In an embodiment, cost of execution of tasks associated with particular content elements may be taken into account when the content is modified based on the recorded user activity. For example, the cost of execution of tasks associated with each selected content element to be prominently displayed to a user may be determined (or predetermined) and each element may be displayed in accordance with the recorded user behavior and determined cost. For example, it may determined that a user consistently views only the first ten search results out of a thousand rendered search results. Accordingly, only the first ten results may be retrieved and shown to the user in subsequent session(s). In an embodiment, the remainder of the results may be rendered to a user upon additional request.

In an embodiment, remaining pages of content may be informed about the user activity on one page of content and the content on the remaining pages may be modified accordingly. For example, if it is determined that a user prefers to view customer reviews of each product, the "customer reviews" category or a hyperlink to the customer reviews may be displayed with the researched type of product on all pages of a Web site that the user is viewing.

In an embodiment, if the same Web site is open on a plurality of different tabs on a client computing device, the modifications made to content in one tab may be propagated to the content displayed on other open tabs. For example, if it is determined that a content element associated with customer reviews is popular with a particular user (e.g., the user selected the content element), the content element "migrates" toward the top of the updated page of content. Similar modifications may be made to content displayed on other open tabs. For example, if the content element "customer reviews" migrated to the top of the page viewed by the user as a result of content modification based on the user activity, other content elements "customer reviews" (if present) may "migrate" to the top of each page of content displayed in each open tab.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes a Web server 106 for receiving requests and serving content in response thereto, although for other networks, an alternative device serving a similar purpose could be used, as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, generating statistics, and other such purposes. It should be understood that there can be many other aspects that may need to be stored in the data store, such as for page image information and access right information, which can be stored in any of the above-listed mechanisms as appropriate or in additional mechanisms in the data store 110. The data store 110 is operable, through logic associated therewith, to receive instructions from the application server 108 and obtain, update, or otherwise process data in response thereto. In one example, a viewer might submit a search request for a certain type of item. In this case, the data store might access the user information to verify the identity of the viewer, and can access the catalog detail information to obtain information about items of that type. The information then can be returned to the viewer, such as in a results listing on a Web page that the viewer is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limited to the scope of the disclosure.

Figure 2:
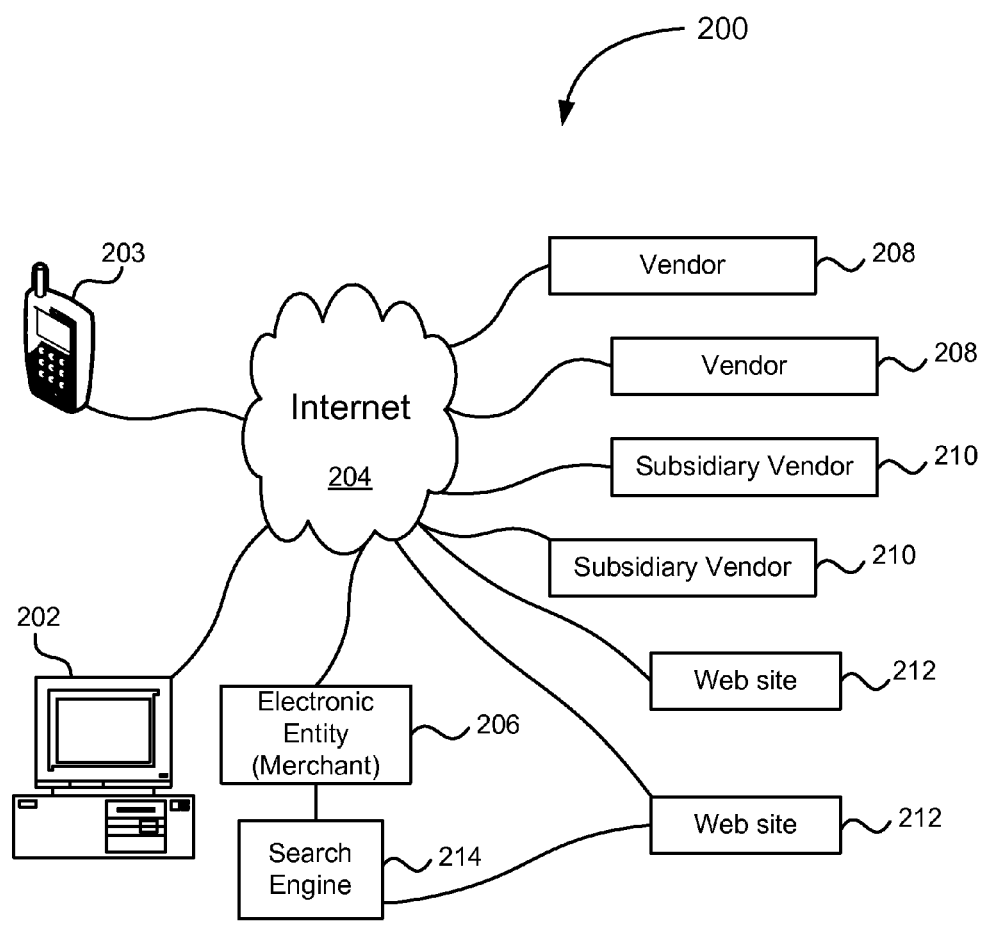
FIG. 2 illustrates an environment in which various embodiments may be practiced.

FIG. 2 shows an example environment 200 in which various embodiments may be practiced. The environment 200 may be realized utilizing one or more of the components of the environment described above in connection with FIG. 1. The environment 200, in an embodiment, includes a plurality of users operating client computing devices 202 and 203 that utilize a network such as the Internet 204 to browse content of various content providers. While the environment 200 shows the client computing devices 202 utilizing the Internet, it should be understood that other networks may be used as an alternative to or in addition to the Internet 204. Examples of other networks include mobile networks, intranets, and generally any suitable communications network. Likewise, it should be understood that client computing devices 202 and 203 may include personal computers, cell phones, handheld messaging devices, laptop computers, set-top boxes, personal data assistants, electronic book readers, and the like.

In an embodiment, users may interact through devices 202 and 203 with other entities in order to consume content, search for information or items for consumption, purchase items for consumption, and the like. As used herein, an item for consumption includes any product or item which may be consumed by a consumer. Examples include tangible items, such as consumer products. Examples also include electronic items which may be downloaded and/or streamed, including audio files, video files, and other digital content. Examples of items for consumption also include services which may be performed for and/or on behalf of consumers. As shown in FIG. 2, the environment 200 includes an electronic entity, or merchant 206. The merchant 206, for example, may operate an electronic marketplace such that the users may search, via devices 202 or 203 utilizing search services (e.g., a Web search engine 214), for items for consumption offered by the merchant 206. The merchant 206 may offer items for consumption that come from various sources, including the merchant's own sources. For example, the merchant 206 may operate systems, such as those described above in connection with FIG. 1, that enable others to utilize the systems to offer items for consumption.

In short, the merchant 206 may facilitate user search and consumption of items or products offered by the merchant 206 and/or vendors 208 and/or 210, as well as creating wishlists of items by the users of devices 202 or 203.

In an embodiment, the environment 200 includes one or more affiliate or third-party vendors 208. In an embodiment, an affiliate vendor is a merchant who offers for consumption items that are actually consumed by consumers from the merchant 206. Affiliate vendors 208 may cooperate with the merchant 206 in various ways. In one embodiment, the merchant 206 may operate an electronic marketplace, such as a Web site 212 and advertise and/or sell items for consumption that are offered by the affiliate vendor 208. Affiliate vendors 208 may utilize various systems provided by the merchant 206, such as electronic search services that enable users to search for items for consumption, and other systems.

The environment 200 may include one or more subsidiary vendors 210. In an embodiment, a subsidiary vendor is a merchant whose operations may be controlled, either completely or partially, by the merchant 206. For example, a subsidiary vendor 210 may be operated by the merchant 206, but may offer items for consumption under a different brand than the merchant 206. The subsidiary vendor 210 may offer the same or different products for consumption than the merchant 206. Alternatively, the subsidiary vendor 210 may be operated by the affiliate vendor 208, but may offer items for consumption under a different brand than the affiliate vendor 208, which may be advertised and/or offered for sale by the affiliate vendor 208 on the merchant 206's Web site 212.

In an embodiment, the environment 200 includes components and instructions for generating one or more Web sites 212. One or more of the Web sites 212 may be operated by the merchant 206, although they need not be. The Web sites 212 may offer various types of content, such as news, video, shopping for products, and the like. The Web sites 212 may offer other services, such as content or product search services, audio, social networking services, and the like. While the example environment 200 shows Web sites for the purpose of illustration, it should be understood that any type of content provider may be included in the environment 200 or variations thereof. For example, content may be provided in various ways, such as through an application interface or through other mechanisms that may not be properly classified as Web sites.

As noted, in an embodiment, the users may interact with content from the various entities, such as by searching products offered by the entities, viewing content from the entities, consuming items from the entities, creating wishlists, and the like. In order to search for items or other content provided by the entities, the users may utilize a search service, e.g., the Web search engine 214. As one skilled in the art will appreciate, a Web search engine may be a software or a combination of software and hardware designed to search for information on the Internet. The search engine may be rendered to a client device 202 via a particular Web site or Web sites, such as the Web sites 212. The Web search engine 214 may be affiliated with the merchant 206 in a number of different ways, such as, for example, it may be designed and/or owned by the merchant 206, operated by the merchant 206, contracted by the merchant 206, be independent or autonomous from the merchant 206, and the like. The content of the Web site 212 may be modified based on the user activity as will be described below in greater detail.

Figure 3:
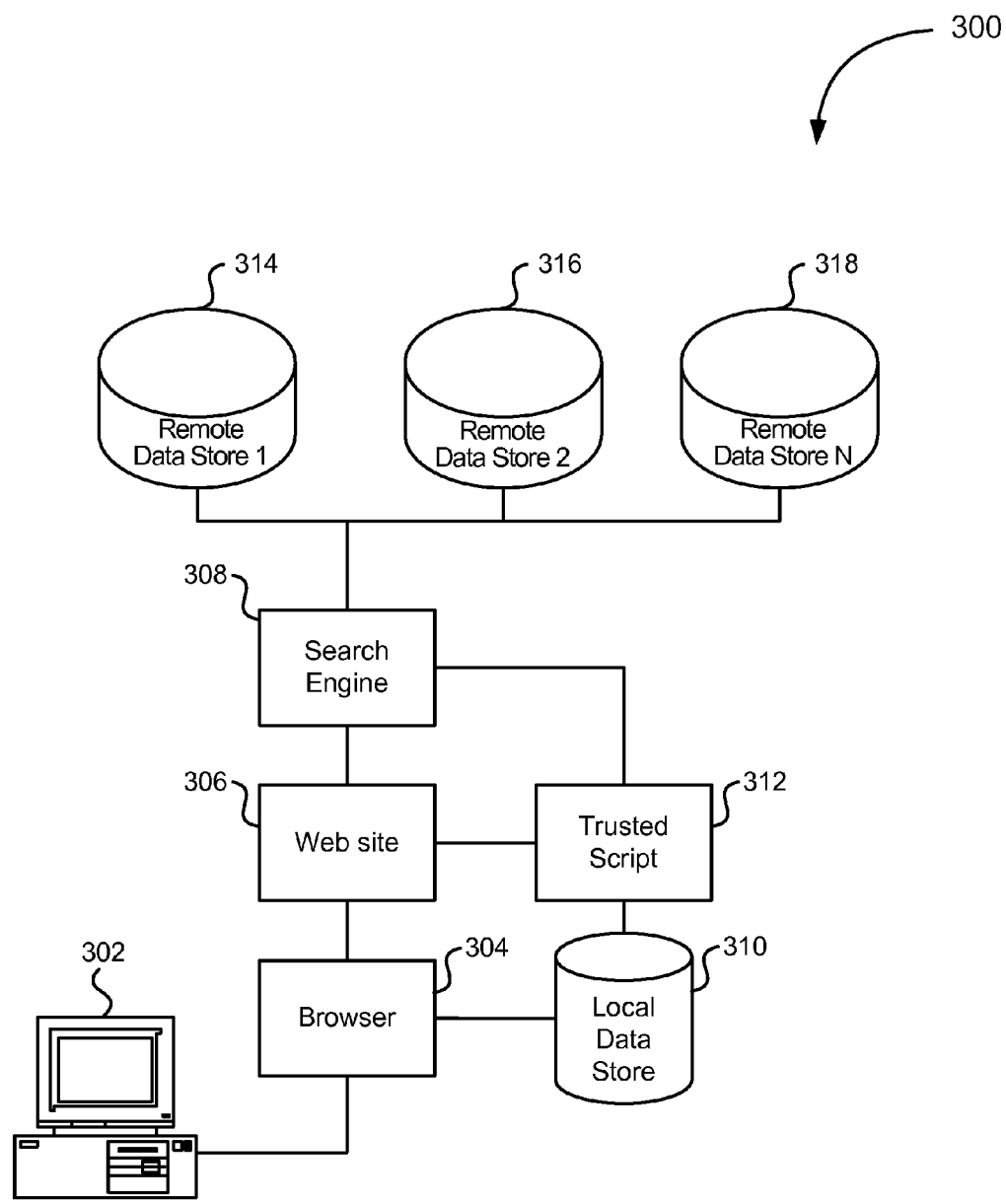
FIG. 3 illustrates a diagrammatic representation of an environment which may incorporate one or more components that are described above in connection with FIGS. 1 and 2 and that may be used in accordance with various embodiments.

FIG. 3 shows an illustrative environment 300 that an electronic entity such as the merchant 206 may utilize in order to provide a user with an ability to repeatedly search for product items or other content offered by the merchant 206 and/or vendors 208 and 210 such that the user can keep track of already-viewed products or content. The environment 300 may be implemented to increase search efficiency for the users utilizing one or more client devices 202 and thus increase effectiveness for one or more of the entities 206, 208, and/or 210 shown in FIG. 2. In an embodiment, the environment 300 of FIG. 3 is utilized by an electronic entity (such as the merchant 206 shown in FIG. 2) to provide improved search experience to a user using a search service described herein. It is to be understood that the search service may comprise a number of various implementations, including, but not limited to, a software application component executed on a computing device, such as one or more Web servers. In one embodiment, the service may be offered as a part of remote computing services that together make up a cloud computing platform, offered over the Internet. The service may be configured to run in a Web server environment, such as a pure Java HTTP Web server environment.

In an embodiment, the environment 300 includes a client computing device 302 utilized by a user for interaction with electronic entities that provide content. Content may be accessed by a user operating the device 302 through a browser 304. For example, content may include products or items of various types that are to be placed on a Web site 306. The content may be stored in the remote content data store(s) 314, 316, and 318 and may be utilized by merchants, Web sites, or other entities in order to provide users an opportunity to search for, and view, items for consumption and/or other content. In an embodiment, the content data stores 314-318 store content to be provided to users, such as when users request the content by navigating to a Web site 306 operated by a merchant (e.g., merchant 206 on FIG. 2). The Web site 306 may utilize a search engine 308 in order to provide a user with the ability to search for products offered by the merchant 206 or other entities. It will be appreciated that the content may be stored in one or more data stores and that three data stores 314, 316, and 318 are shown for purely illustrative purposes, such that the number of data stores is not limited to three or any other number. The term "remote" used in conjunction with the term "data store" simply means that the data stores 314, 316, or 318 are not placed in an application operating on the computing device 302 or in the computing device itself. The remote data stores may be accessible with the search engine 308 through the Internet or any other type of computer network known in the art. The remote data stores may be associated with the electronic entity, such as above-noted merchant 206. For example, the remote data stores may be associated with a server serving the Web site 306 operated by the merchant 206.

In an embodiment, a trusted script 312, implemented in one embodiment as a JavaScript® and operating on the Web site 306 that is loaded by the browser 304, is configured to keep track of user activities while searching items provided by the content data stores 314-318. In some embodiments, the trusted script may also be implemented as an ActionScript®, VBScript®, Java Servlet®, Flash®, JScript® or other scripting languages. Specifically, the trusted script 312, in an embodiment, may utilize information such as user selections of content elements, browsing of search results, assigning weight values described above, executing content elements migration on the page, and the like. Information associated with user activity on the Web site may be stored in a local data store 310. The trusted script 312 may be loaded on a page of the Web site 304 when a user accesses the Web site. In another embodiment, the trusted script may be implemented and is an extension (i.e., a plug-in application) to the browser. In general, the trusted script 312 does not have to be Web site-specific; the script may be provided as a part of a browser or be installed as an extension to a browser.

The local data store 310 may be implemented in a number of different ways. For example, in an embodiment, the data store 308 may comprise a dedicated database accessible by the trusted script 312. In some Web environments, such as, for example, one provided by the HyperText Markup Language (HTML) 5, the local data store 310 may be allocated within a Web site or within a domain. For example, the local data store 310 may be embedded in the pages of the Web site 306 and may be shared with any page visited by the user on that Web site. Thus, the trusted script 312 may communicate with the local data store 310 within the browser 304 that displays the Web site 306 to a user. In another embodiment, information related to the user activity and associated data may be stored in the memory of the trusted script 312 loaded in a page of the Web site 306. In yet another embodiment, the information and associated data may be stored in the memory of a trusted frame, such as an iFrame embedded in the Web site 306. It will be appreciated that different ways of implementing a local data store configured to store the user activity data and related data may be employed.

Figure 4:
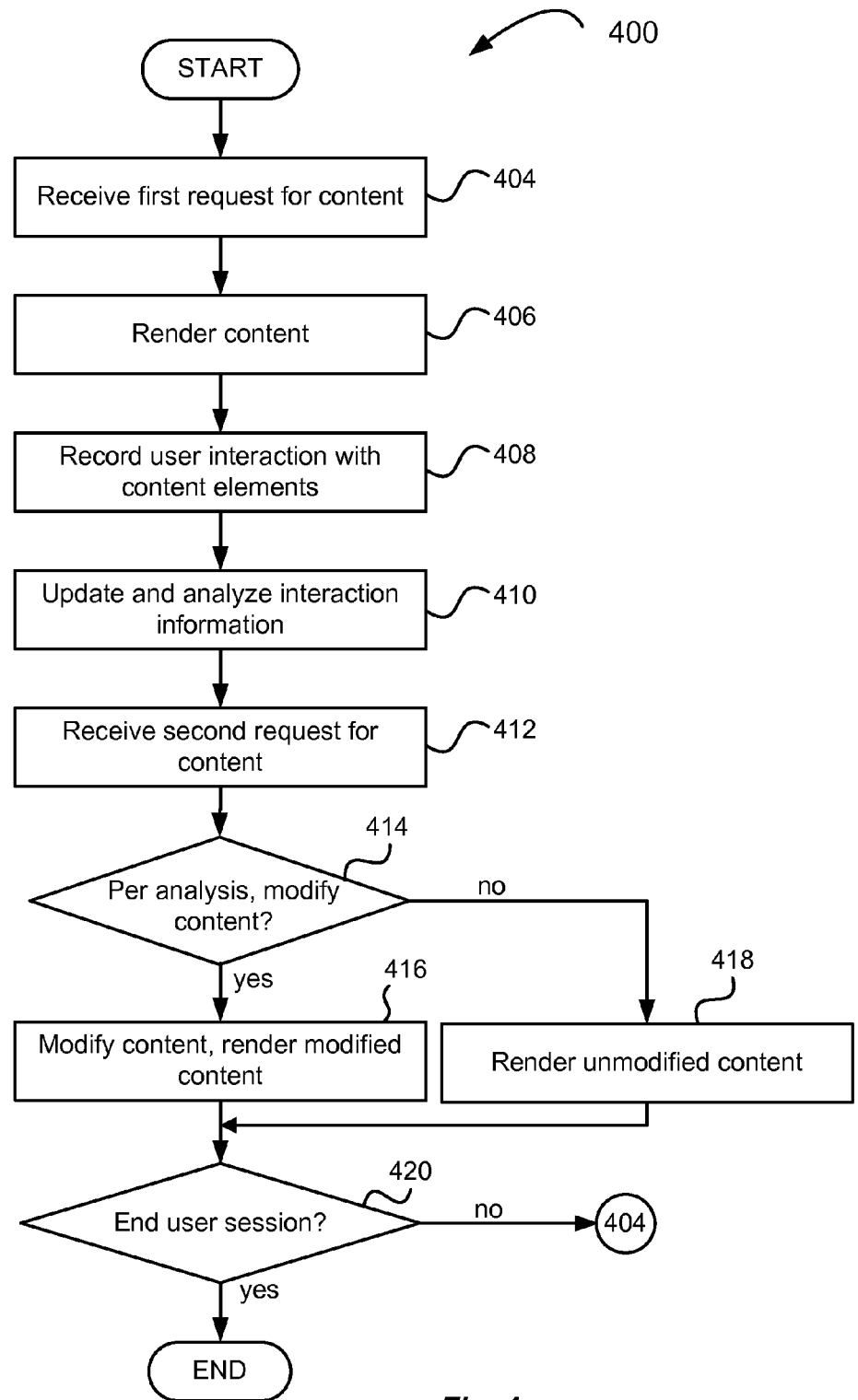
FIG. 4 illustrates a process flow diagram for providing personalized content in accordance with an embodiment.

FIG. 4 illustrates a process flow diagram for providing personalized content in substantially real time in accordance with an embodiment. The process 400 begins at block 404 where a first request for content is received from a user. At block 406, a requested content, for example a Web site described in reference to FIG. 3, is rendered to the user. At block 408, the user interaction with content elements comprising content is recorded and stored in a local or remote repository, e.g., one of data stores described above in reference to FIG. 3.

In one embodiment, information reflecting the user interaction with content elements may be stored in a remote repository (data store) associated with a "back end" server. This information may be retrieved and utilized when the same user accesses the Web site. For example, the user may next visit the Web site one year after the current visit. The information regarding the user interaction with the content elements on the Web site may be used to "tailor" the Web site to user needs by making the selected content elements more prominent on the page as will be described below in greater detail.

Returning to FIG. 4, at block 410, the recorded user interaction information is analyzed and/or updated. For example, each content element selected by the user may be assigned a weight value reflecting the amount of user activity associated with this element and recorded at block 408. This weight value may be used in order to determine a degree of prominence of the content element on the rendered content. In an embodiment, the selected content element may be moved up to the top of the page each time the content is reloaded. In another embodiment, the weight assigned to the selected content element may indicate that the content element should migrate all the way to the top of the page. This embodiment will be discussed below in reference to FIG. 6 in greater detail.

At block 412, a second request for content is received from the user. At decision block 414, it is determined whether the content to be returned in response to the second request should be modified in accordance with the updated interaction information described at block 410. Content modification may be accomplished in a number of different ways. For example, the most often selected content elements may be placed prominently relative to the content elements that were selected not as frequently (e.g., selected by the user a number of times that is below a predetermined threshold) or not selected by the user at all. Displaying selected content elements (e.g., item category, a "search" button, or price range) prominently may be accomplished by placing these content elements above other content elements on the page (e.g., moving these elements to the top of the page), and/or changing color, size, shape, or other display properties of the content elements.

In one embodiment, content provided at the second request for content may be modified by providing content that was not rendered in response to the first request. For example, based on previously recorded interaction of the user with the page it was determined that the user would like to see product-related information (e.g., particular product category) that was not rendered in response to the first request. Accordingly, in response to the second request, the desired information may be rendered to the user.

Returning to FIG. 4, if it is determined that the content should be modified, the content is modified and rendered to user at block 416. Content modification may occur during the user session at a user request as described above or in a subsequent user session. If at block 414 it is determined that the content should not be modified, the unmodified updated content is rendered to the user at block 418. At determination block 420, it is determined whether the user session ended. If the user session continues, the process moves back to block 404, thus reflecting the continuous nature of the content modification based on the user activity during the user session. If the user session ended, the process 400 ends.

In one embodiment, after the content rendered to the user has been modified, in some cases numerous times during a single user session, the Web site reverts to its original "pre-modification" state after the user session has ended. In other words, all modifications made during a user session may not be saved and the Web site assumes its "pre-modification" state. In another embodiment, the modifications made to the content may be saved so that the user, when accessing the Web site in the next session, may take advantage of the content "tailored" to the user's needs.

Figure 5:
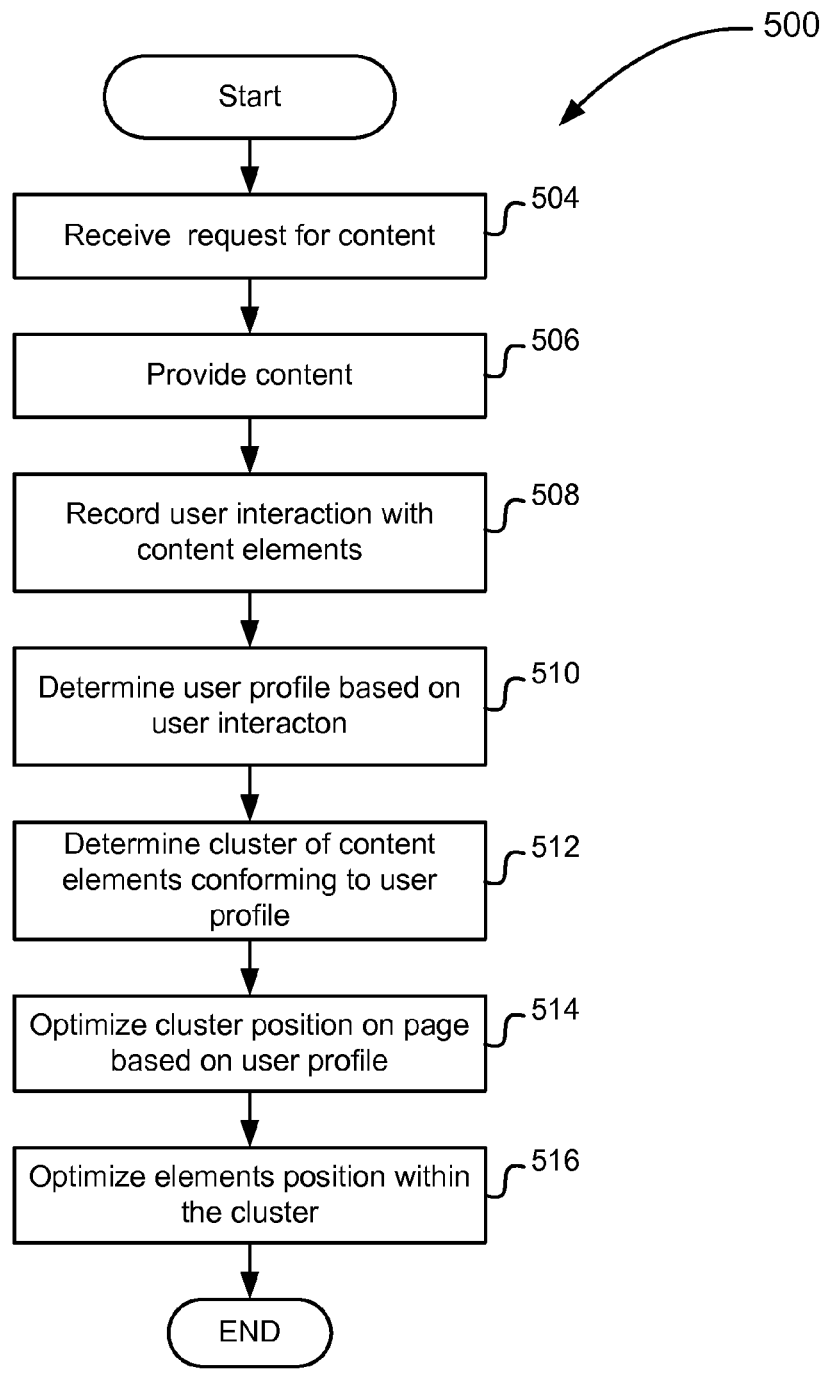
FIG. 5 illustrates a process flow diagram for providing personalized content in accordance with another embodiment.

FIG. 5 illustrates a process flow diagram for providing personalized content according to a user profile in substantially real time in accordance with an embodiment. As discussed above, a user profile may be determined based on the analysis of the user activity. Accordingly, one or more content elements corresponding to the determined user profile may be identified and rendered to the user during the same user session or in subsequent sessions. The process 500 begins at block 504, where a request for content from a user is received. At block 506, the requested content is provided. At block 508, the user interaction with content elements comprising the content is recorded and stored as described in reference to FIG. 4.

At block 510, the user profile is determined based on the recorded user interaction with the content element. A user during the user session may exhibit behavior that conforms to a particular user category. For example, a user may as a matter of course compare prices to items of similar nature (e.g., compare prices of watches with similar characteristics but different brands). In another example, a user may consistently do research on a particular item or items by accessing customer reviews of the desired item(s). In yet another example, a user may conduct a product search on the content resource (Web site) when a user knows exactly what product he/she wants to purchase. Generally, a particular pattern of a particular user behavior may be discerned from the user's activity on a Web site.

According to a determined pattern (profile), one or more selectable content elements utilized in the determined pattern may be identified. For instance, a "customer review reader" may always need the content element that links to customer reviews. As shown in FIG. 5, at block 512, a cluster of selectable content elements that conforms to a determined user profile may be identified. In an embodiment, when more than one content element pertinent to a user profile is identified, the whole cluster of the identified content elements may be optimized, e.g., moved up the page of content. Accordingly, at block 514, the position of the cluster of content elements is optimized based on the determined user profile. For example, the "customer review"-related content element(s) will be moved up the page and presented to the user when the content on the page is modified (e.g., when refreshed).

Within the cluster, a position of each content element may also be optimized according to a determined user profile. For example, if a user falls into a "price comparison" profile, a cluster comprising links to brands of watches and links to watch prices may be moved up the page, the link to prices being placed above the link to brands as the "price link" may be used by a "price comparison" user more often than the "brand link." Accordingly, at block 516, the position of each element within the cluster is optimized (the example of such optimization is illustrated and described in reference to FIG. 12). The process 500 then ends.

Figure 6:
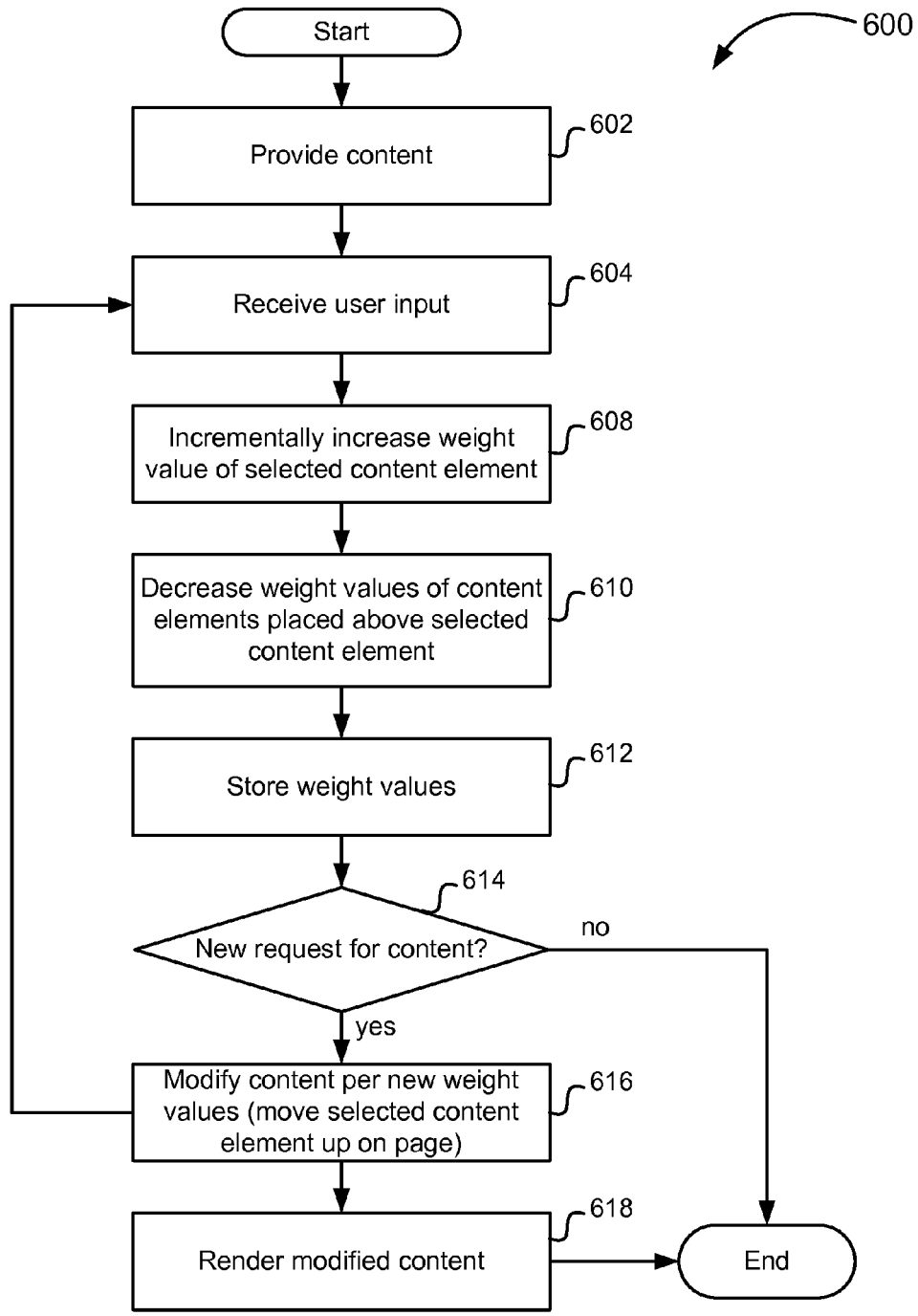
FIG. 6 illustrates a process flow diagram for providing personalized content in accordance with yet another embodiment.

FIG. 6 illustrates a process flow diagram providing personalized content in substantially real time in accordance with another embodiment. As described above in reference to FIG. 4, each content element selected by the user may be assigned a weight value reflecting the amount of user activity associated with this content element. The process 600 begins at block 602 where the content is provided to the user. At block 604, a user input or interaction is received. At block 604, the weight value of each accessed content element is increased, in one embodiment incrementally. For example, the "pace" of selectable content element migration up the page may be determined by, or correspond to, the assigned weight. By way of example, if a content element is assigned "+1," the content element may migrate one level up the page when the updated page is rendered to the user. In an embodiment, a weight assigned to a selected content element may be given a special "boost" in order to make the content element more prominent on a modified page when the content element is associated, for example, with a product popular with other users.

In an embodiment, content elements located near or above the selected content element may be assigned "negative" weight indicating that these elements should migrate down the page. For example, a selectable content element located initially above the selected content element, may be assigned value of "−0.2" indicating that this element should migrate down the page when the updated page is rendered to the user. Accordingly, at block 610, the weight values of content elements placed above selected content elements is decreased. At block 612, the weight values for each content element assigned in blocks 608 and 610 are stored in a local or remote repository. At decision block 614, it is determined whether a new request for content is received. If such request is received, at block 616, content is modified in accordance with the new weight values assigned to content elements. In one embodiment, content elements would move up and down the page in accordance with assigned weight values. At block 618, the modified content is rendered to the user. The process 600 then ends.

Figure 7:
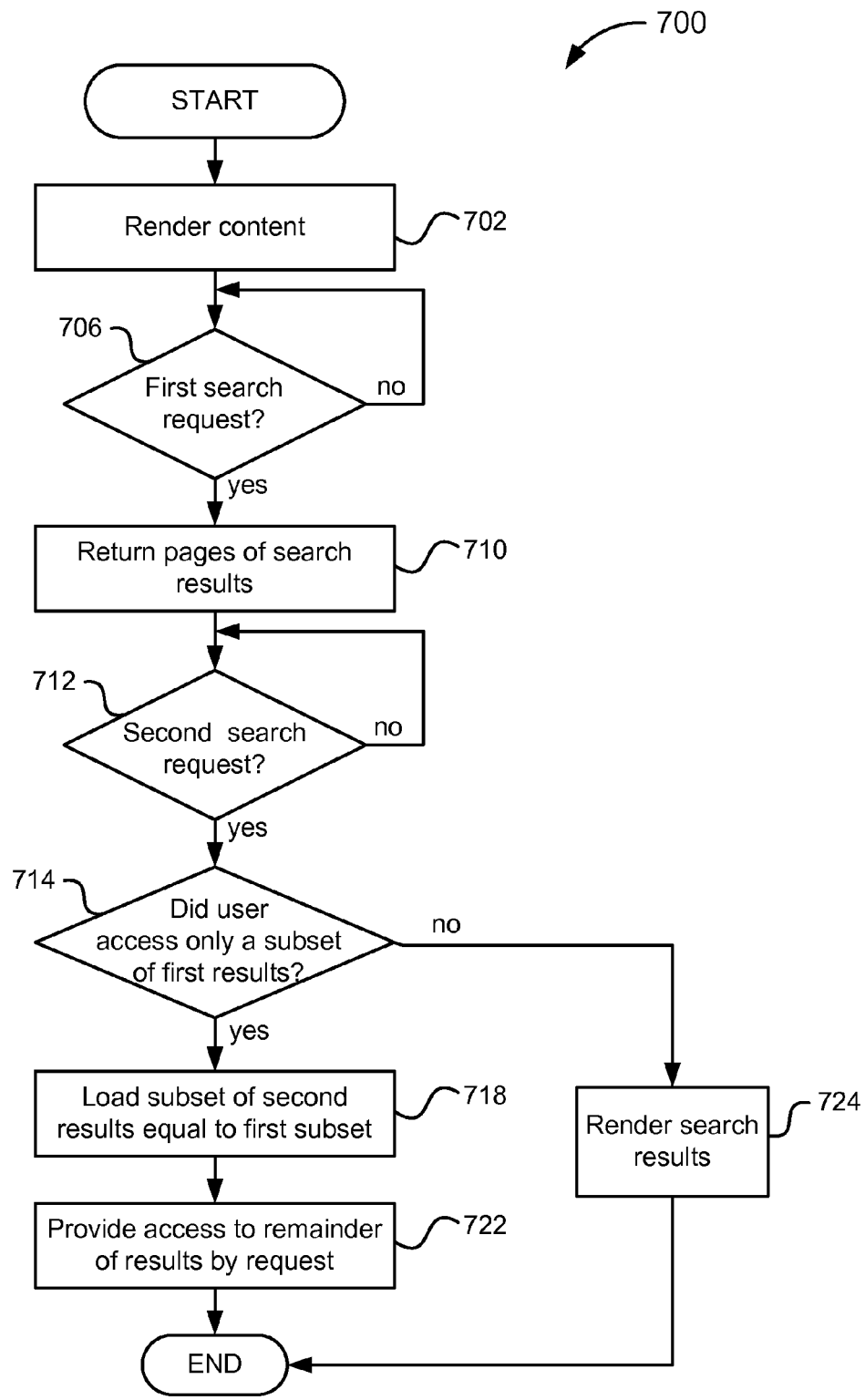
FIG. 7 illustrates a process flow diagram for providing personalized content in accordance with yet another embodiment.

FIG. 7 illustrates a process flow diagram for providing personalized content in substantially real time in accordance with another embodiment. As described above, the cost of execution of tasks associated with selecting particular content elements may be taken into account when the content is modified based on the recorded user activity. If it is determined, for example, that a user consistently views only the first ten search results out of a thousand rendered search results, only the first ten results may be retrieved and shown to a user when the user requests another search and the cost of retrieving and rendering the remainder of the results may be saved. In an embodiment, the remainder of the results may be rendered to a user upon additional request.

The process 700 begins at block 702 when the content is rendered to the user. The decision block 706 determines whether a first search request is received. If the search request is received, the pages of search results are returned in response to the first search request at block 710. At decision block 712, it is determined whether a second search request is received. If the second search request is received, at decision block 714, it is determined whether a user accessed only the subset of first results which are in response to first search request. If the user accessed only a particular subset of a search results in turn in response to a first search request, at block 718, the subset of second results equal in size to the subset of first results is retrieved and rendered to the user. At block 722, the user is given access to the remainder of the results that are not rendered by request. If the user accessed the whole set of results returned in response to the first search request at block 724, the full set of search results is rendered to the user in response to the second search request. The process 700 then ends.

Figure 8:
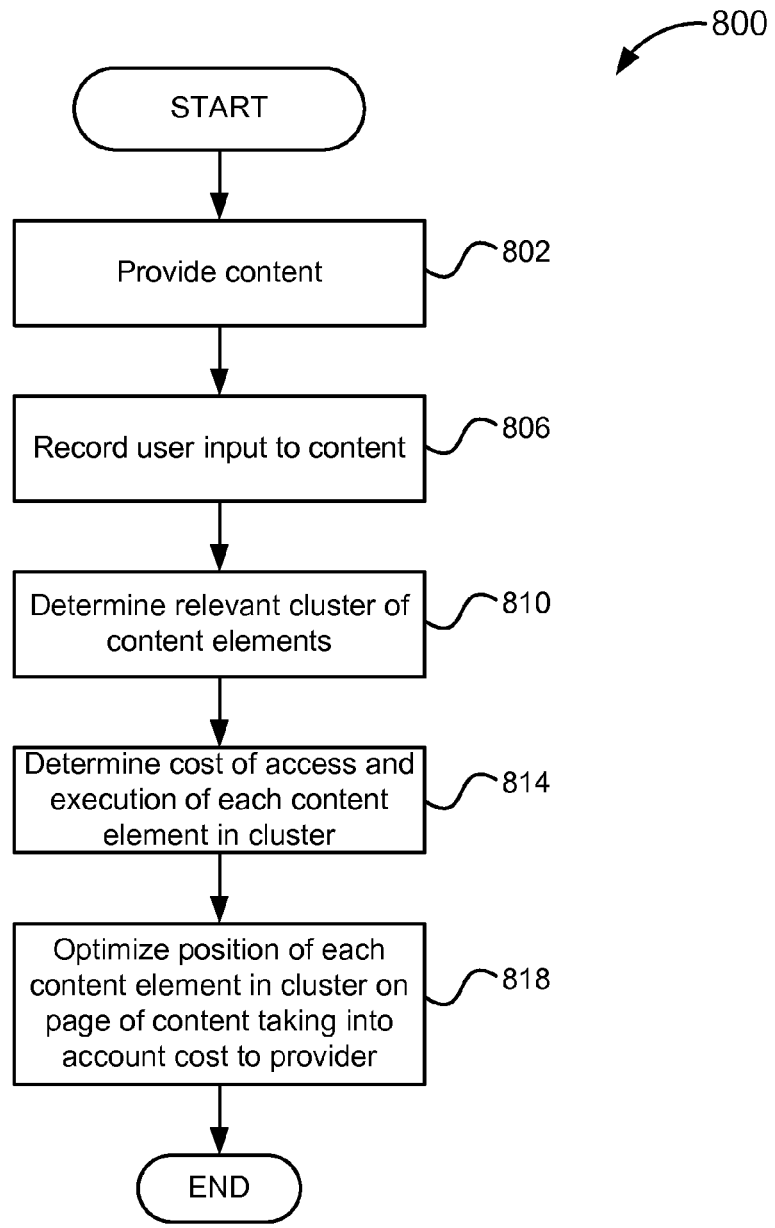
FIG. 8 illustrates a process flow diagram for providing personalized content in accordance with yet another embodiment.

FIG. 8 illustrates a process flow diagram for providing optimized content in substantially real time in accordance with another embodiment. As discussed above, the cost to a content provider of execution of tasks associated with each selectable content element to be rendered to a user based on user's activities on the content may be determined. For example, the cost of accessing the data repository on a "back end" of an electronic marketplace, retrieving a substantial number (for example, a few thousand) of results and rendering the retrieved results to a client computing device may cost about $0.2-$5.0 to a content provider.

Accordingly, while each selectable content element may be prominently displayed to a user in accordance with the recorded user behavior as described above, the determined cost of execution of tasks associated with the selectable content elements may be taken into account. Assume execution of a selected content element costs, for example, $50 to a content provider. Then, instead of displaying a previously selected content element at the top of the page, this content element may be "tucked away" among others in the content element cluster that is prominently displayed to the user among the rest of the selectable content elements on the page so that the user may select the content element in question judiciously. In one embodiment, it may be determined that due to a high cost of execution (e.g. above a predetermined threshold value) a particular content element should not migrate at all to a more prominent position on the page even though its selection by a user was detected and recorded previously.

The process 800 begins at block 802 where the content is provided to the user. At block 806, the user interaction with the content is recorded. At block 810, a relevant cluster of content elements is determined based on the recorded user interaction. At block 814, the cost of access and execution of each content element in the determined cluster is identified. At block 818, the position of each content element in the cluster on the page of content is optimized taking into account the cost of access and execution of each content element to provider. The process 800 then ends.

Figure 9:
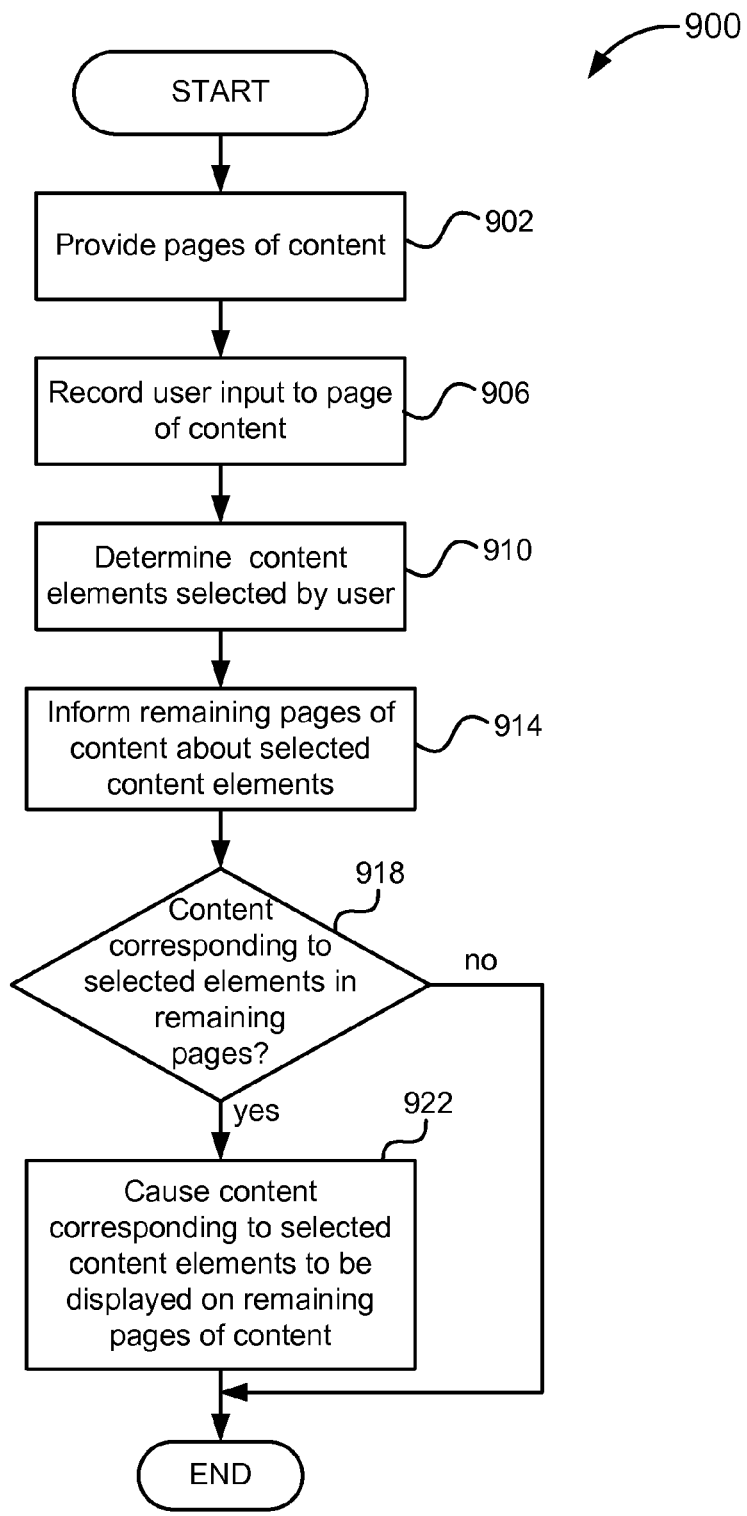
FIG. 9 illustrates a process flow diagram for providing personalized content in accordance with yet another embodiment.

FIG. 9 illustrates a process flow diagram for providing personalized content in substantially real time in accordance with yet another embodiment. If content, e.g., a Web site, is rendered to a user as a plurality of pages, the user typically views the first page and then scrolls down or selects a different (e.g., next) page and so on. In an embodiment, the user activity on a first page of content may not only be recorded for further optimization (personalization) of content, but also the remaining pages of content (e.g., pages describing product or item details) may be informed about the user activity on a page of content and the content on the remaining pages may be modified accordingly. For example, if it is determined that a user prefers to view customer reviews of each product, the "customer reviews" category or a hyperlink to the customer reviews may be displayed with the researched type of product on all pages of a Web site that the user is viewing.

In another example, if a user indicates on the first page (e.g., by selecting a relevant content element) that he/she prefers to view only certain type (e.g. "prime") items, the remaining pages of content may be modified to show the option of "prime" items to the user. In yet another example, it may be determined whether at least some of the content elements selected by the user on the front page are rendered on the remaining pages and if these content elements are identified, the content elements will be prominently displayed on the remaining page just in a manner that their counterparts are prominently displayed on the first page of the modified content.

The process 900 begins at block 902 where the pages of content are provided to the user. At block 906, the user interaction with a page of content is recorded. At block 910, content elements accessed by a user during the user interaction are determined. At block 914, the remaining pages of content are informed about accessed content elements. At block 918, it is determined whether there is content corresponding to accessed content elements in the remaining pages of content. If the content corresponding to accessed element pages is determined to exist in remaining pages, at block 922, the content corresponding to access content elements is displayed on the remaining pages of content. The process 900 then ends.

Figure 10:
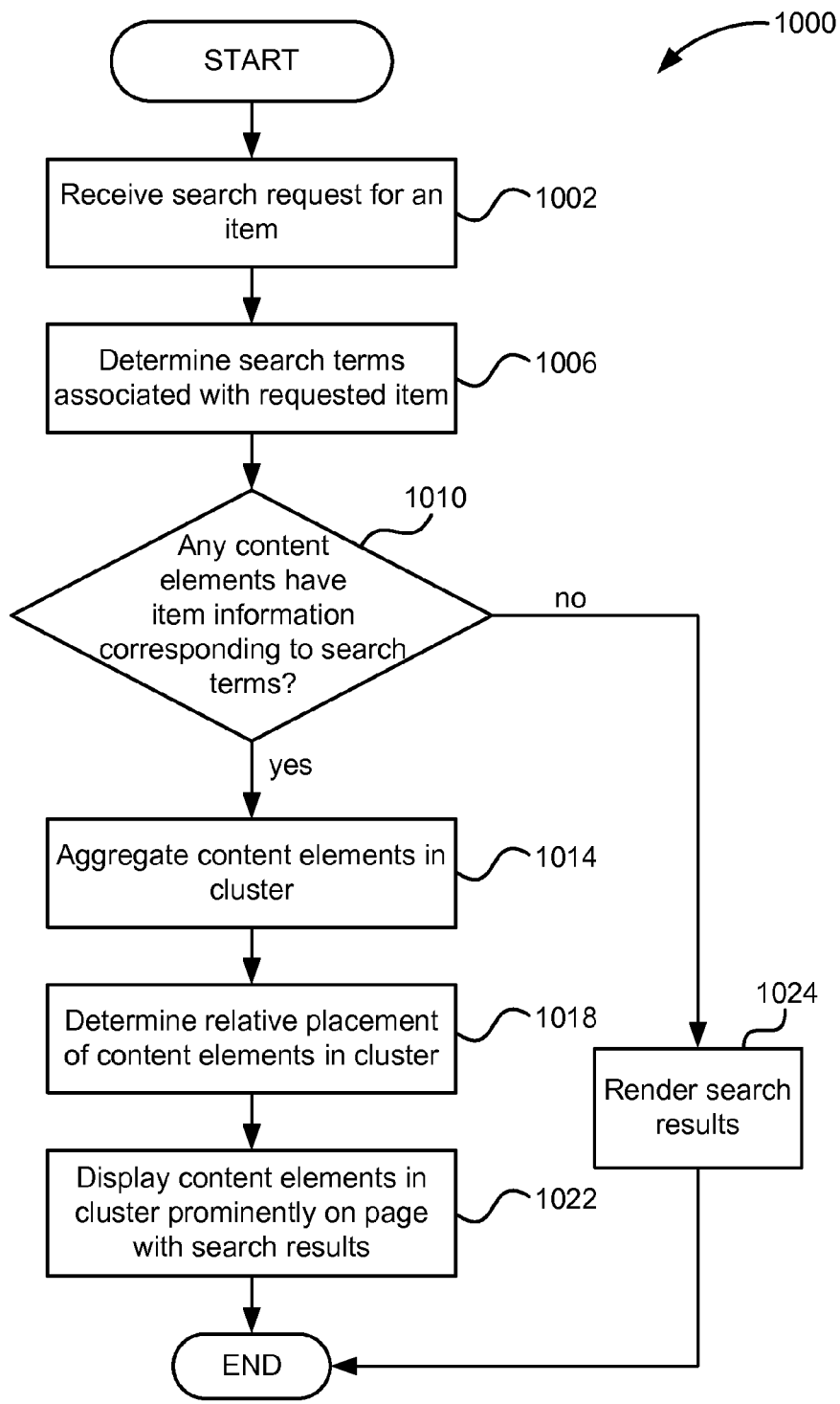
FIG. 10 illustrates a process flow diagram for providing personalized content in accordance with yet another embodiment.

FIG. 10 illustrates a process flow diagram for providing personalized content in substantially real time in accordance with yet another embodiment. When a user conducts a search of a Web site, e.g., a search of a particular item, the search terms associated with the item may be determined. Based on the search terms for the item, the selectable content elements containing information about the item may be identified and displayed prominently in a modified content. For example, if a user is searching for a drill on a Web site, it may be determined that a particular selectable content element (e.g., an icon representing "best deals of the day") may be determined to have a "best deal" drill associated with it (e.g., information regarding the drill may be linked to the icon). Accordingly, the icon may be displayed more prominently when the content is modified based on the user activity as described before. An example of an implementation of this embodiment will be described in reference to FIG. 14.

The process 1000 begins at block 1002 where a search request for an item is received. At block 1006, the search terms associated with the requested item are determined. At decision block 1010, it is determined whether any content elements existing on the page have item information corresponding to the search terms. If there are content elements that have item information corresponding to the determined search terms, at block 1014, the content elements may be aggregated in the cluster. At block 1018, the relative placement of content elements in the cluster is determined. At block 1022, the content elements in the cluster are displayed prominently on the page along with the search results provided in response to the search request for an item received at block 1002. If there are no content elements that would have item information corresponding to the search terms, at block 1024, the results are rendered to the user. The process 1000 then ends.

FIGS. 11-14 illustrate example screenshots of content pages that are to be modified or have been modified in substantially real time according to a recorded user activity in accordance with an embodiment. The screenshots illustrated in FIGS. 11-14 are shown for illustrative purposes only and should not be interpreted as limiting the scope of the various embodiments.

Figure 11:
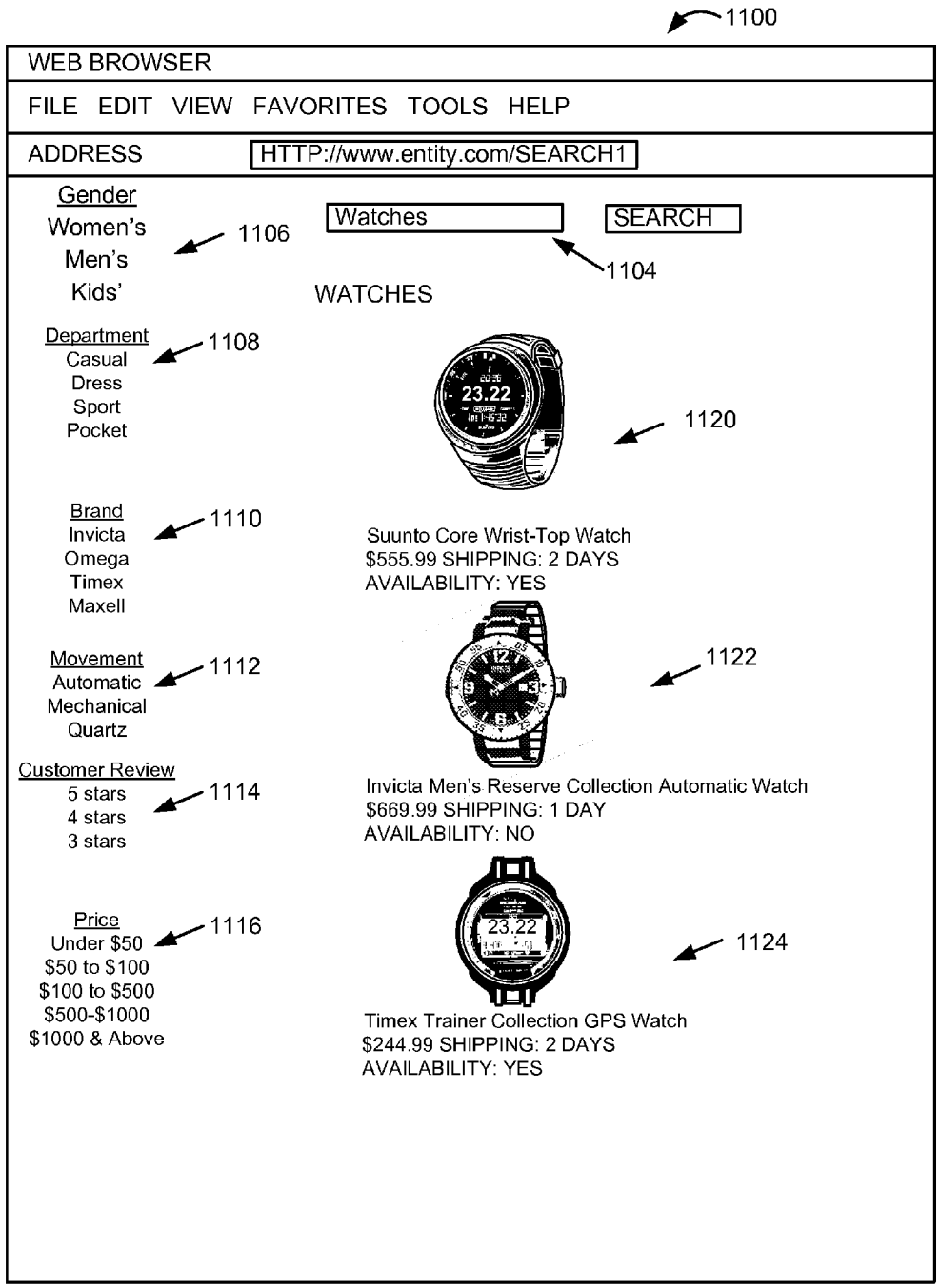
FIG. 11 illustrates an example screenshot of a content page to be modified in substantially real time according to a recorded user activity in accordance with an embodiment.

FIG. 11 illustrates an example screenshot of a content page to be modified in substantially real time according to a recorded user activity in accordance with an embodiment. The Web page 1100 includes selectable content elements 1106-1116 representing different categories ("Gender," "Department," "Brand," "Movement," "Customer Review," and "Price") that enable a user to refine his/her search for an item, in this example, a watch. The page 1100 also includes a search field 1104 in which a user may enter search terms (e.g., "watches" in this example). The page 1100 further includes examples of watches 1120-1124 presented to a user, in one embodiment, prior to his/her search for a watch.

Figure 12:
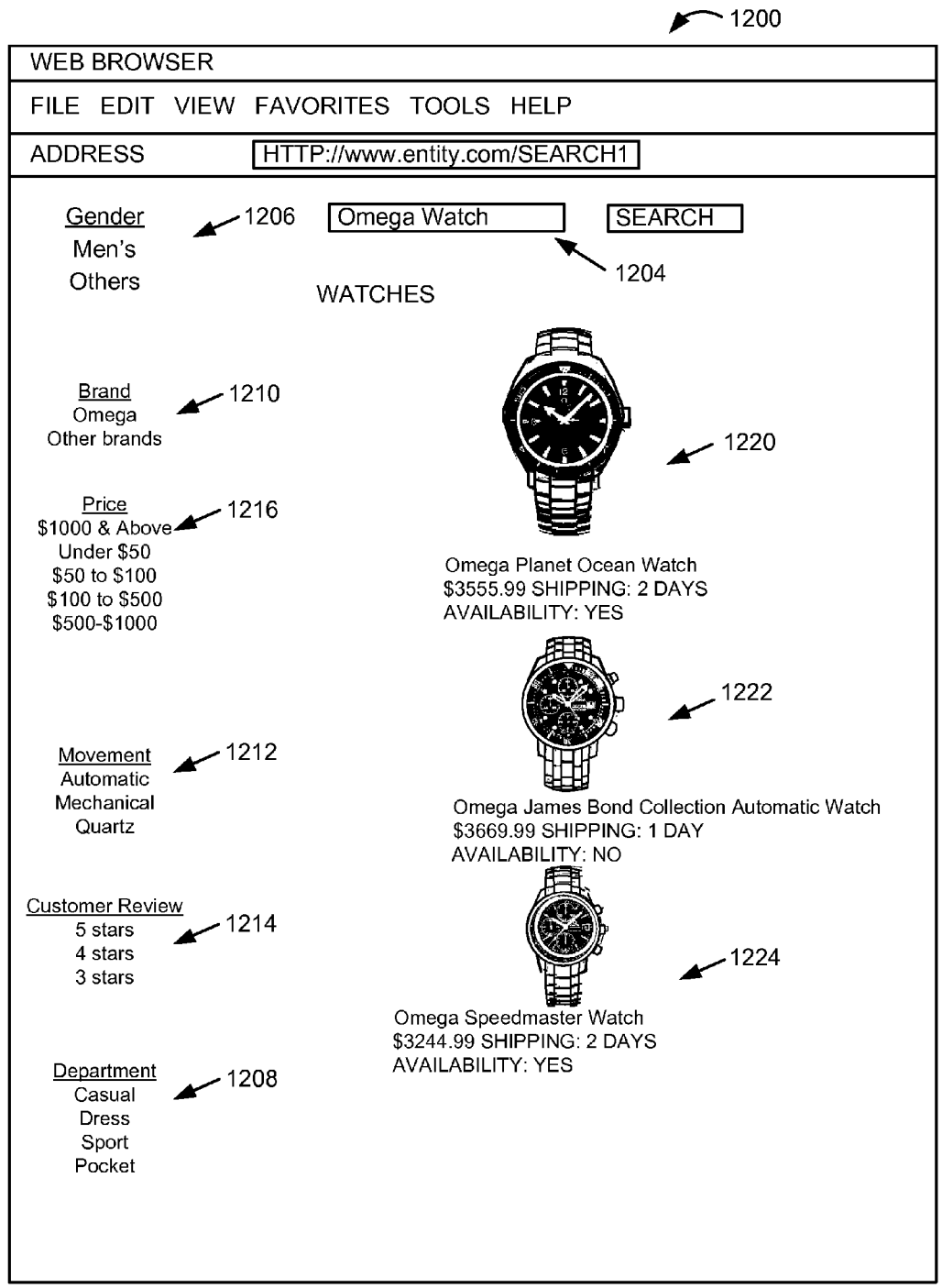
FIG. 12 illustrates an example screenshot of a content page modified in substantially real time according to a recorded user activity in accordance with an embodiment.

FIG. 12 illustrates an example screenshot of a content page that was modified in substantially real time according to a recorded user activity in accordance with an embodiment. The Web page 1200, like the page illustrated in FIG. 11, includes selectable content elements 1206-1216 representing different categories ("Gender," "Department," "Brand," "Movement," "Customer Review," and "Price"), a search field 1204 (including a search term), and watches 1220-1224 found in a search conducted by the user. The selectable content elements 1210 ("Brand") and 1216 ("Price") migrated to the top of the page according to the user activities recorded on the previous page. As described above in reference to FIGS. 4 and 6, the user activity on the page of content (e.g., selecting particular selectable content elements) is recorded and modification of content that takes into account the user activity occurs when the content is reloaded (refreshed) by the user, such as moving the selected content elements to the top of the modified page of content. For example, the user may have selected the "Brand" and the "Price" categories on the previous page and according to the detected user activity these categories migrated upward on the page.

In another example, as described above in reference to FIG. 5, the selectable content elements may be identified according to a user profile determined based upon the recorded user activity on the page of content. The identified selectable content elements then may be placed in a prominent position on a reloaded page of content in order to provide easy access for the user. In reference to FIG. 12, let us assume that the content elements 1210 and 1216 were identified as ones corresponding to a user profile that was determined based on the user activity. Accordingly, these content elements are placed prominently relative to other selectable content elements on the page shown in FIG. 12. The positions of elements 1210 and 1216 may also be optimized relative to each other. For example, if it is determined that the user selected the "Brand" category more often than the "Price" category, the "Brand" category 1210 may be placed above the "Price" category 1216.

In an embodiment, selectable content elements associated with other selectable content elements may also be optimized according to the recorded user activity. For example, the category "Gender" 1206 is associated with three selectable content elements ("Men's," "Women's" and "Kids"). If it is determined that a user is looking for men's watches, other categories ("Women's" and "Kids") within the "Gender" category 1206 may not be displayed. Instead, a link to these categories (e.g., the link indicated as "Others") may be displayed in case the user decides to expand his/her search to these categories. Similarly, if it is determined that the user is interested in the Omega brand, the titles of other brands may not be displayed. Instead, a link to other brand titles within the "Brand" category may be rendered to the user in case the user decides to expand his/her search. Similarly, if it is determined that the user is primarily interested in the price range "$1,000 & Above," this category may be placed above other price range categories in the "Price" category 1216.

Figure 13:
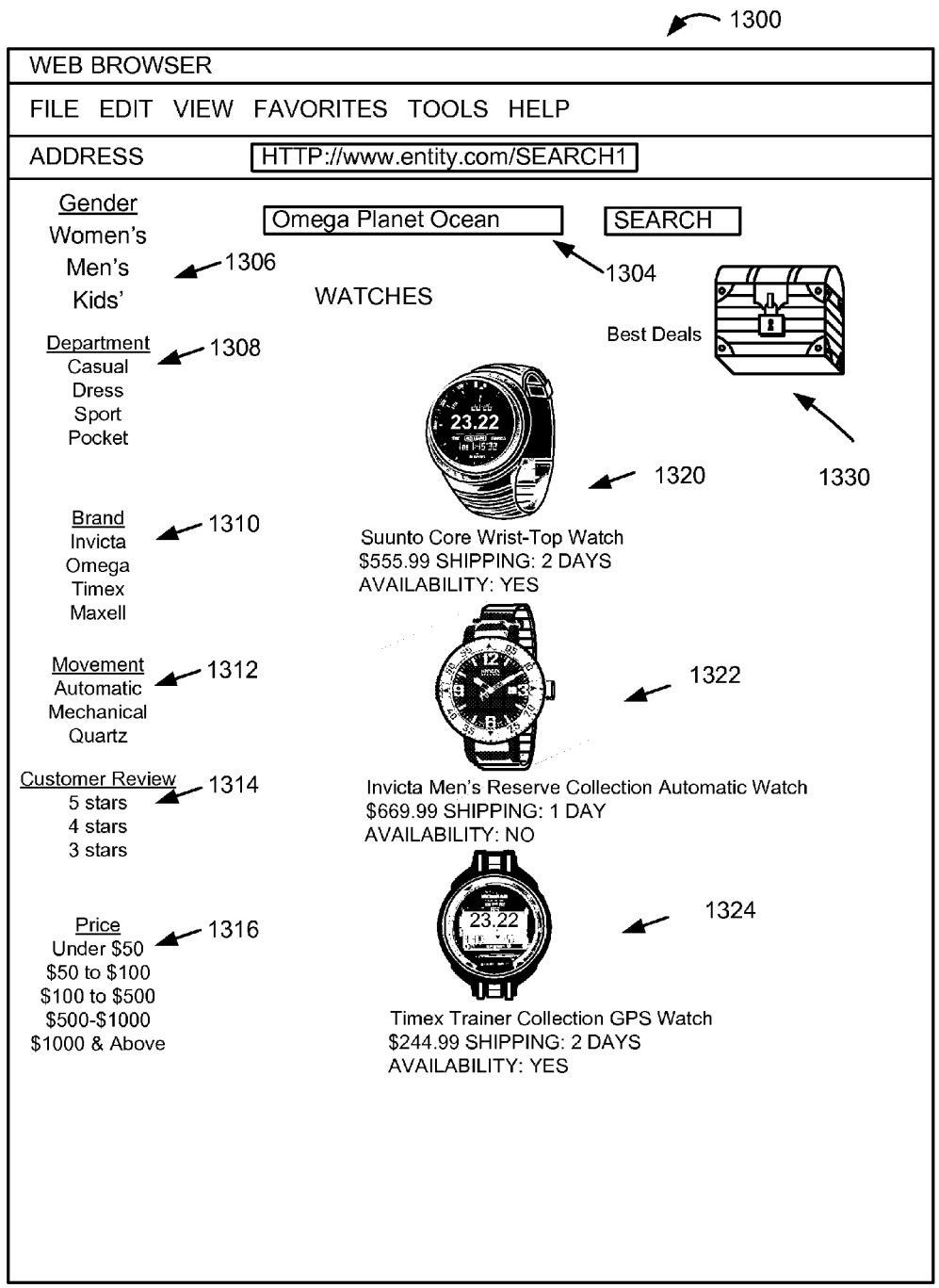
FIG. 13 illustrates another example screenshot of a content page to be modified in substantially real time according to a recorded user activity in accordance with an embodiment.

FIG. 13 illustrates an example screenshot of a content page to be modified in substantially real time according to a recorded user activity in accordance with another embodiment. The page 1300, like pages illustrated in FIGS. 11-12, includes selectable content elements 1306-1316 representing different categories ("Gender," "Department," "Brand," "Movement," "Customer Review," and "Price"), a search field 1304 (including a search term), and example watches 1320-1324. In addition, the page 1300 includes a selectable content element 1330 "Best Deals." In an embodiment, this content element may indicate (e.g., link to) the items for sale that are the best deals on today's trade on the Web site. For example, if a user clicks on the "treasure chest" icon 1330, the "treasure chest" will "open" and display the best deals to the user (e.g., show links to the best deals or take the user to the "best deals" page). It is assumed that a user is looking for a watch Omega Planet Ocean and a Planet Ocean watch happens to be one of the "best deals" for the day and is "hidden" in the "treasure chest" 1330. Further explanation of this example is provided below in reference to FIG. 14.

Figure 14:
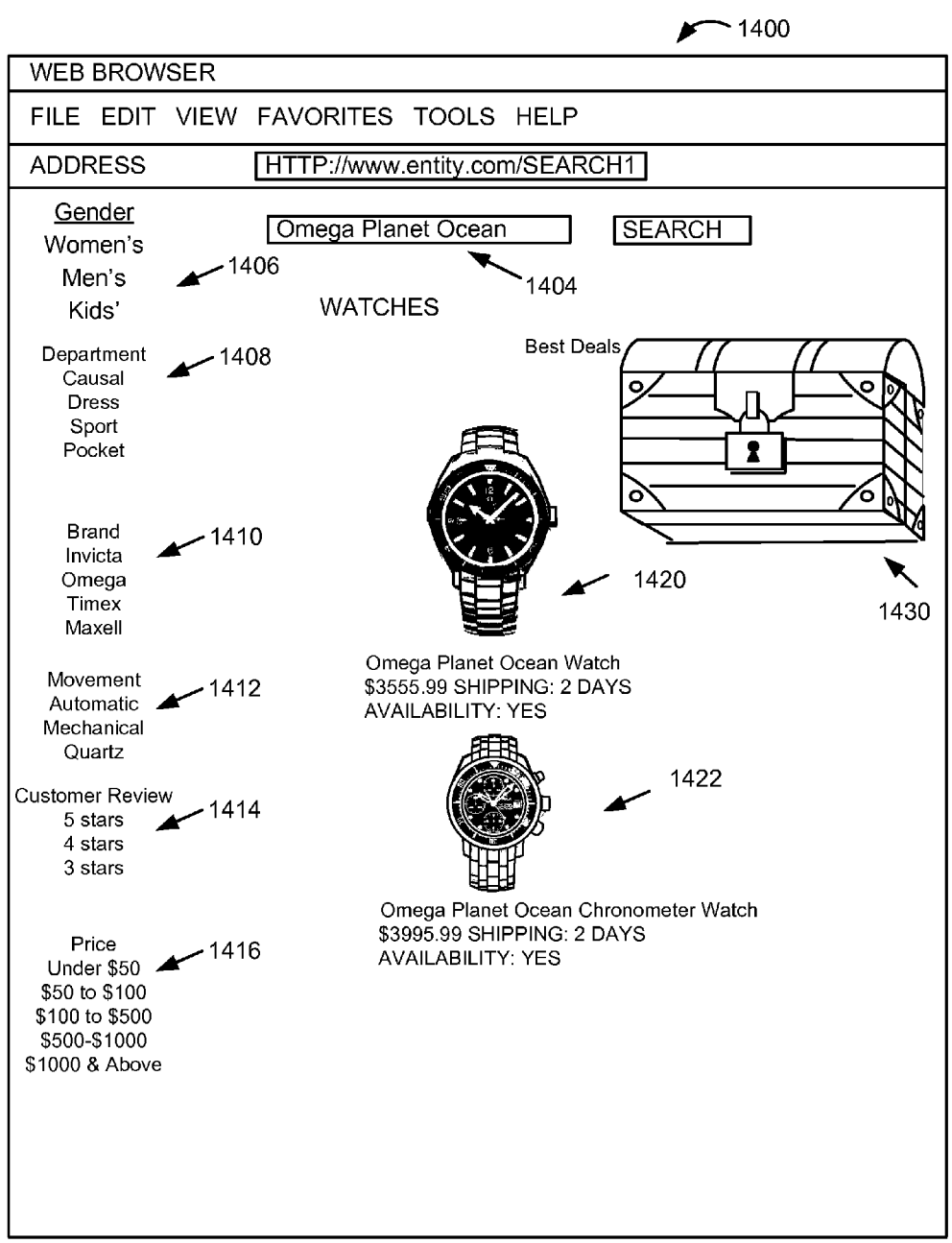
FIG. 14 illustrates another example screenshot of a content page modified in substantially real time according to a recorded user activity in accordance with an embodiment.

FIG. 14 illustrates an example screenshot of a content page modified in substantially real time according to a recorded user activity in accordance with an embodiment. The page 1400, like the page illustrated in FIG. 13, includes selectable content elements 1406-1416 representing different categories ("Gender," "Department," "Brand," "Movement," "Customer Review," and "Price") and a search field 1404 (including a search term). The page further includes watches 1420 and 1424 rendered in return for the user search of a watch Omega Planet Ocean as described in reference to FIG. 13. In addition, the page 1300 includes a selectable content element 1430 "Best Deals" that in turn links to an Omega Planet Ocean watch that is one of the "best deals" for the day.

As described in reference to a process flow diagram illustrated in FIG. 10, the content element 1430 should be displayed prominently on the page 1400, prompting the user to select the content element. Accordingly, as illustrated in FIG. 13, the content element 1430 is displayed prominently on the page. Specifically, the "treasure chest" icon 1430 is bigger than the corresponding icon 1330 in FIG. 13, thus being more prominent on the page and therefore more appealing to the user.

As discussed above, the various embodiments can be implemented in a wide variety of operating environments, which in some cases can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices, as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method for providing personalized content in substantially real time, comprising:
under the control of one or more computer systems configured with executable instructions,
providing first content to a first user in response to a first request by the first user, the first content comprising at least one of product, video, audio, or image content, and including a plurality of user-selectable content elements displayed with the first content;

assigning a weight value to each selected content element, the weight value reflecting an amount of user activity by the first user with a corresponding content element;

determining an interaction of the first user with respect to a displayed page of at least a portion of the first content, the interaction including a selection by the first user of at least one of the plurality of the user-selectable content elements displayed on the page;

determining a new weight value to each selected content element based at least upon the interaction of the first user, the new weight value of each selected content element modified from the weight value assigned to a corresponding selected content element;

receiving a plurality of content ratings for each selected content element from a plurality of additional users;

determining a popularity score for each selected content element based on the plurality of content ratings for each selected content element;

increasing the new weight value based on the popularity score;

determining a subset of the plurality of user-selectable content elements corresponding to the at least one selected content element based on the updated information; and providing second content to the first user in response to a second request by the first user, the second content comprising at least one of product, video, audio, or image content, and including at least a portion of the first content modified by adjusting display properties of each user-selectable content element of at least a portion of the determined subset of the user-selectable content elements relative to one or more user-selectable content elements displayed on the page of the first content that were not selected by the first user, the second content further including additional content generated based on the interaction with the first content and not included in the first content, wherein the display properties of a specific user-selectable content element of the at least a portion of the determined subset of the user-selectable content elements are modified based at least partially upon a new weight value of the specific user-selectable content element.

2. The computer-implemented method of claim 1, wherein adjusting display properties of each user-selectable content element of the at least a portion of the subset of the user-selectable content elements includes at least one of:

assigning a positive weight value to each content element in the portion of the subset, the assigning of the positive weight value causing the corresponding content element to move up the page when the first content is modified, or changing display characteristics of each user-selectable content element of the at least a portion of the subset, the display characteristics including parameters related to color, shape, or size of the user-selectable content element.

3. The computer-implemented method of claim 1, further comprising:

modifying remaining pages of the first content according to the modifications to the first page of the first content, wherein each user-selectable content element on the remaining pages is modified corresponding to the modification of the corresponding content element on the page of the modified first content.

4. A computer-implemented method for providing personalized content in substantially real time, comprising:

under the control of one or more computer systems configured with executable instructions, providing, to a first user, first content comprising at least one of product, video, audio, or image content, and including a plurality of user-selectable content elements;

assigning a weight value to each selected content element, the weight value reflecting an amount of user activity by the first user with a corresponding content element;

detecting an interaction of the first user with respect to the provided first content, the interaction including a selection by the first user of at least one of the plurality of the user-selectable content elements displayed on a page of the first content;

determining a new weight value to each selected content element based at least upon the interaction of the first user, the new weight value of each selected content element modified from the weight value assigned to a corresponding selected content element;

receiving a plurality of content ratings for each selected content element from a plurality of additional users;

determining a popularity score for each selected content element based on the plurality of content ratings for each selected content element;

increasing the new weight value based on the popularity score; and providing second content to the first user in response to a request by the first user, the second content comprising at least one of product, video, audio, or image content, and including at least a portion of the first content modified according to a new weight value of a specific user-selectable content element by moving the at least one user-selectable content element up on a page of the second content relative to a position of the at least one content element on the page of the first content, the second content further including additional content generated based on the interaction with the first content and not included in the first content.

5. The computer-implemented method of claim 4, wherein at least a portion of the first content is further modified by at least one of: increasing a size of the at least one user-selectable content element or changing a color of the at least one user-selectable content element.

6. The computer-implemented method of claim 4, wherein at least a portion of the first content is further modified by decreasing visibility of at least a portion of the plurality of the user-selectable content elements that were not selected by the user.

7. The computer-implemented method of claim 4, further comprising:

receiving a first search request for a first item in the content;

identifying at least one search term associated with the first item;

determining one or more content elements associated with the first item based on the identified search term; and prominently displaying the one or more content elements with first search results returned in response to the first search request.

8. The computer-implemented method of claim 7, further comprising:
receiving a second search request for a second item in the content;
determining a size of a first subset of the first search results accessed by the first user; and
displaying a second subset of the second search results returned in response to the first search request, the second subset having a size equal to that of the first subset.

9. The computer-implemented method of claim 4, further comprising:
determining a subset of the plurality of the user-selectable content elements that were selected by the first user in the provided first content;
determining a cost of execution of each selected content element; and
prominently displaying the subset in the second content taking into account the determined cost of execution of the selected content element in the subset, wherein when the cost of execution exceeds a predetermined threshold the corresponding selected content element is displayed less prominently relative to other content elements in the subset or relative to the remainder of the plurality of the user-selectable content elements.

10. The computer-implemented method of claim 5, further comprising: migrating at least one of the content elements that were not selected down the page of content.

11. A computer-implemented method for providing personalized content in substantially real time, comprising:
under the control of one or more computer systems configured with executable instructions,
providing first content to a first user in response to a first request by the first user, the first content comprising at least one of product, video, audio, or image content, and including a plurality of user-selectable content elements;
assigning a weight value to each selected content element, the weight value reflecting an amount of user activity by the first user with a corresponding content element;
recording information corresponding to an interaction of the first user with respect to a displayed page including at least a portion of the first content, the interaction including a selection by the first user of at least one of the plurality of the user-selectable content elements displayed on the page;
determining a new weight value to each selected content element based at least upon the interaction of the first user, the new weight value of each selected content element modified from the weight value assigned to a corresponding selected content element;
receiving a plurality of content ratings for each selected content element from a plurality of additional users;
determining a popularity score for each selected content element based on the plurality of content ratings for each selected content element;
increasing the new weight value based on the popularity score;
determining a user profile based on the recorded information, the user profile including a new weight value of a specific user-selectable content element;
identifying a subset of the plurality of the user-selectable content elements corresponding to the determined user profile; and
providing second content to the first user in response to a second request by the first user, the second content comprising at least one of product, video, audio, or image content, and including at least a portion of the first content modified according to the determined user profile by placing the identified subset on the at least one page in a prominent position relative to at least a portion of the first content corresponding to one or more content elements of a remainder of the plurality of the user-selectable content elements placed on the at least one page, the second content further including additional content generated based on the interaction with the first content and not included in the first content.

12. The computer-implemented method of claim 11, wherein determining a user profile based on the recorded information further includes analyzing stored historic information of the user interaction by the first user with the content.

13. The computer-implemented method of claim 11, further comprising:
storing the determined user profile; and
providing the subset of content elements corresponding to the stored user profile in a next user session with the content.

14. The computer-implemented method of claim 11, wherein
the user profile is selected from a customer review viewer profile and a price comparison viewer profile.

15. A computer system for providing personalized content in substantially real time, the system comprising:
a processor; and
a memory having computer-executable instructions that, when executed on the processor, cause the processor to:
provide first content to a first user comprising at least one of product, video, audio, or image content, and including a plurality of user-selectable content elements;
assign a weight value to each selected content element, the weight value reflecting an amount of user activity by the first user with a corresponding content element;
detect an interaction of the first user with respect to the provided first content, the interaction including a selection by the first user of at least one of the plurality of the user-selectable content elements displayed on a page of the first content;
determine a new weight value to each selected content element based at least upon the interaction of the first user, the new weight value of each selected content element modified from the weight value assigned to a corresponding selected content element;
receive a plurality of content ratings for each selected content element from a plurality of additional users;
determine a popularity score for each selected content element based on the plurality of content ratings for each selected content element;
increase the new weight value based on the popularity score; and
provide second content to the first user in response to a request by the first user, the second content comprising at least one of product, video, audio, or image content, and including at least a portion of the first content modified according to a new weight value of a specific user-selectable content element by moving the at least one user-selectable content element up on a page of the second content relative to a position of the at least one content element on the page of the first content, the second content further including additional content generated based on the interaction with the first content and not included in the first content.

16. The computer system of claim 15, wherein the computer-executable instructions cause the processor to further modify at least a portion of the first content by at least one of: increasing a size of the at least one user-selectable content element or changing a color of the at least one user-selectable content element.

17. The computer system of claim 15, wherein the computer-executable instructions cause the processor to further modify at least a portion of the first content by decreasing visibility of at least a portion of the plurality of the user-selectable content elements that were not selected by the first user.

18. The computer system of claim 15, wherein the computer-executable instructions further cause the processor to:
receive a first search request for a first item in the content;
identify at least one search term associated with the first item;
determine one or more content elements associated with the first item based on the identified search term; and
prominently display the one or more content elements with first search results returned in response to the first search request.

19. The computer system of claim 18, wherein the computer-executable instructions further cause the processor to:
receive a second search request for a second item in the content;
determine a size of a first subset of the first search results accessed by the first user; and
display a second subset of the second search results returned in response to the first search request, the second subset having a size equal to that of the first subset.

20. A non-transitory computer-readable storage medium having computer-executable instructions for providing personalized content in substantially real time stored thereon that, when executed by a computer, cause the computer to:
provide, to a first user, first content comprising at least one of product, video, audio, or image content, and including a plurality of user-selectable content elements;
assign a weight value to each selected content element, the weight value reflecting an amount of user activity by a first user with a corresponding content element;
detect an interaction of the first user with respect to the provided first content, the interaction including a selection by the first user of at least one of the plurality of the user-selectable content elements displayed on a page of the first content;
determine a new weight value to each selected content element based at least upon the interaction of the user, the new weight value of each selected content element modified from the weight value assigned to a corresponding selected content element;
receive a plurality of content ratings for each selected content element from a plurality of additional users;
determine a popularity score for each selected content element based on the plurality of content ratings for each selected content element;
increase the new weight value based on the popularity score; and
provide second content to the first user in response to a request by the first user, the second content comprising at least one of product, video, audio, or image content, and including at least a portion of the first content modified according to a new weight value of a specific user-selectable content element by moving the at least one user-selectable content element up on a page of the second content relative to a position of the at least one content element on the page of the first content, the second content further including additional content generated based on the interaction with the first content and not included in the first content.

21. The non-transitory computer-readable storage medium of claim 20, wherein the computer-executable instructions cause the computer to further modify at least a portion of the first content by at least one of: increasing a size of the at least one user-selectable content element or changing a color of the at least one user-selectable content element.

22. The non-transitory computer-readable storage medium of claim 20, wherein the computer-executable instructions cause the processor to further modify at least a portion of the first content by decreasing visibility of at least a portion of the plurality of the user-selectable content elements that were not selected by the first user.

23. The non-transitory computer-readable storage medium of claim 20, wherein the computer-executable instructions further cause the computer to:
determine a subset of the plurality of the user-selectable content elements that were selected by the first user in the provided first content;
determine a cost of execution of each selected content element; and
prominently display the subset in the second content taking into account the determined cost of execution of the selected content element in the subset, wherein when the cost of execution exceeds a predetermined threshold the corresponding selected content element is displayed less prominently relative to other content elements in the subset or relative to the remainder of the plurality of the user-selectable content elements.

24. The non-transitory computer-readable storage medium of claim 21, wherein the computer-executable instructions further cause the computer to migrate at least one of the content elements that were not selected down the page of content.

25. The non-transitory computer-readable storage medium of claim 20, wherein the second content further includes at least a portion provided based on the interaction of the user with respect to the provided first content, wherein the at least a portion was not included in the first content.

* * * * *